Figure 3:
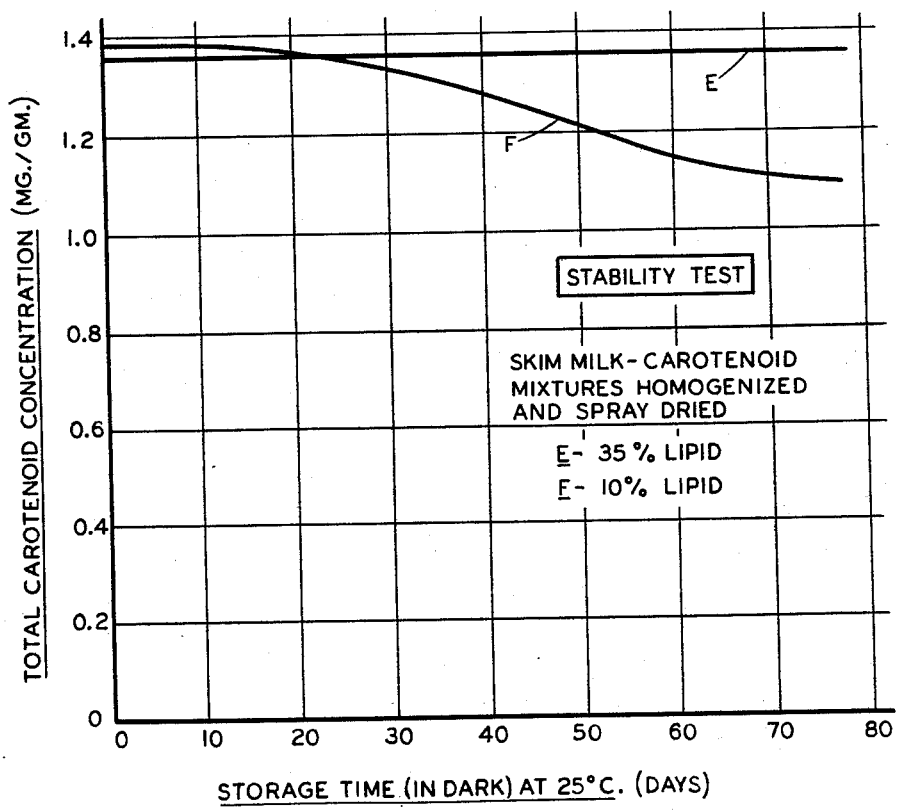

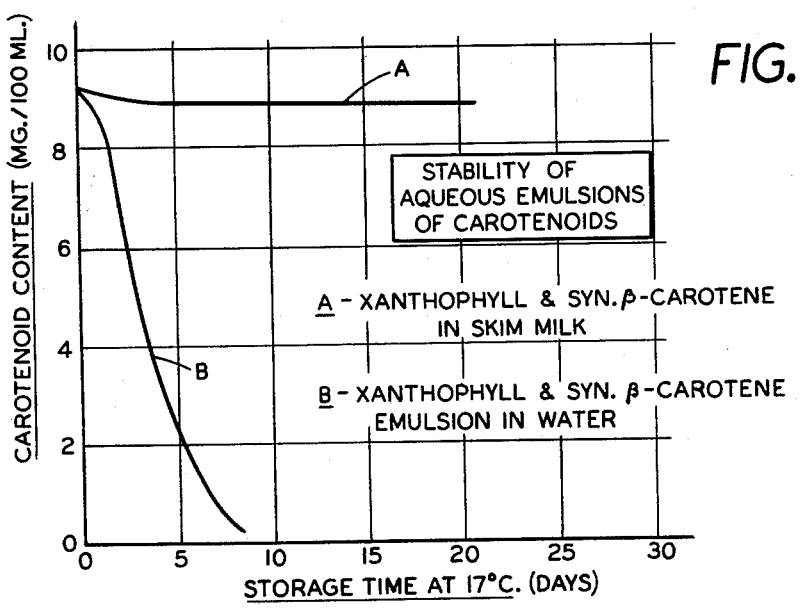

FIG. 1.

STABILITY OF AQUEOUS EMULSIONS OF CAROTENOIDS

A - XANTHOPHYLL & SYN. β-CAROTENE IN SKIM MILK

B - XANTHOPHYLL & SYN. β-CAROTENE EMULSION IN WATER

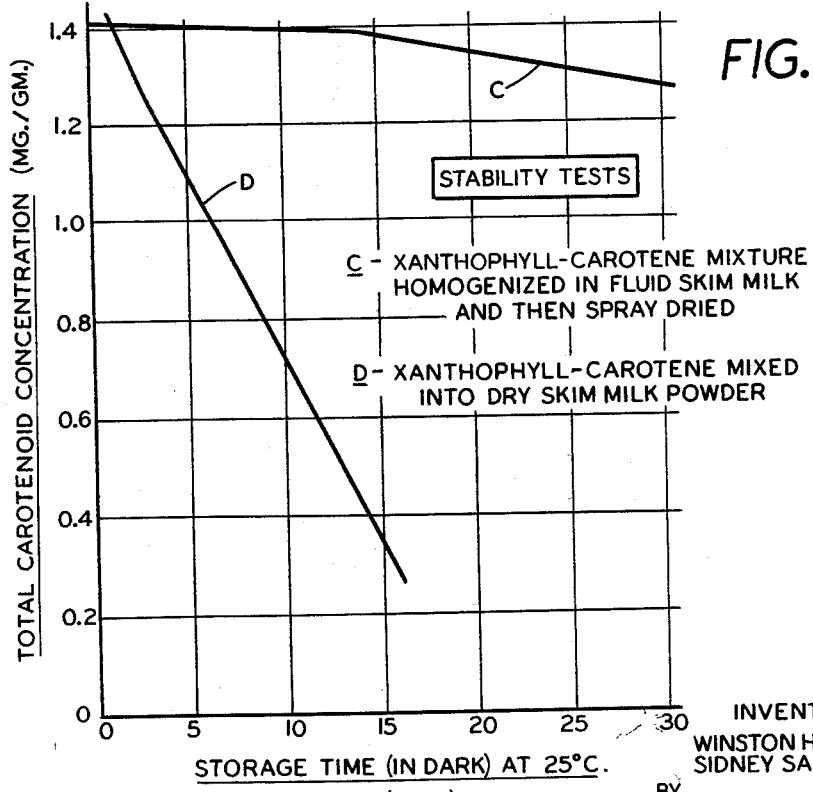

FIG. 2.

STABILITY TESTS

C - XANTHOPHYLL-CAROTENE MIXTURE HOMOGENIZED IN FLUID SKIM MILK AND THEN SPRAY DRIED

D - XANTHOPHYLL-CAROTENE MIXED INTO DRY SKIM MILK POWDER

INVENTORS
WINSTON H. WINGERD
SIDNEY SAPERSTEIN
BY ROBERT CALVERT
ATTORNEY.

3,125,451
CAROTENOID PIGMENT AND PROTEIN COMPLEX AND METHOD OF PRODUCING THE SAME
Winston H. Wingerd, Elgin, and Sidney Saperstein, Bartlett, Ill., assignors to The Borden Company, New York, N.Y., a corporation of New Jersey
Filed Oct. 6, 1960, Ser. No. 60,876
6 Claims. (Cl. 99—148)

This invention relates to carotenoid pigment and protein complexes and the process of making them.

The invention is particularly useful in making water dispersible complexes of the carotenoid and protein that have improved color retention, as at baking temperatures, and that contain all of the solid components originally associated with the protein in the source thereof.

The art of making compositions of carotenoids and proteins recognizes the problems involved. One proposal is to enmesh the carotenoid with a protein physically, precipitating the protein in contact with the carotenoid. Into an alkaline solution of casein, for example, there is introduced a volatile water soluble organic solvent solution of the carotenoid that contains premixed acid in amount to bring the resulting mixture to the isoelectric point for the protein and cause precipitation to occur immediately. In a representative process, this mixing of the organic volatile solvent solution of the carotenoids and the protein is effected within 30 seconds. The precipitated mixture of protein and carotenoid is then filtered. When milk is used as the source of the protein, the water soluble components that remain after the precipitation are lost from the product retained on the filter. In addition to these disadvantages of the process heretofore proposed, some carotenoids are only difficultly soluble in the organic liquid solvent used. Also the solvent, is a precipitating agent for the protein. There is difficulty, therefore, in introducing the desired quantity of the caroteniod into the protein composition. It has been proposed, for this reason, to limit the volume of the organic solvent to not more than $\frac{1}{20}$ of the volume of the aqueous alkali solution of protein admixed, with attendant limitation of the amount of carotenoid that can be thus supplied to the mixture.

The present invention provides a process that requires no volatile organic solvent, loses no solid components from the source of protein, and maintains the carotenoid and protein in intimate contact, without precipitation of protein, until the carotenoid enters into a complex with the protein that is soluble in water at any pH to dissolve the protein alone. It produces a stabilized carotenoid composition of proportion of carotenoid as high in the final complex as economically desirable or necessary for any use of the product.

Briefly stated, the invention comprises the process of and the product resulting from homogenizing an edible oil dispersion, such as a solution of the selected carotenoid, and an aqueous solution of the protein under conditions preventing precipitation of the protein and maintaining contact of the carotenoid and protein in the resulting dispersion at a temperature below that of denaturing the protein and at a pH at which the protein remains water soluble, until a stabilized complex of the carotenoid and the protein results.

In one embodiment, the invention comprises drying the emulsion of the complex so formed, as by usual spray drying technique, to provide the finished stabilized complex of the carotenoid and protein in solid form.

Representative results obtained by us are shown in the attached drawings recording the retention. sometimes referred to herein as "stability," of the characteristic color of the carotenoid on storage at room temperature.

FIG. 1 shows in graph A the high stability obtained when the carotenoid is emulsified with skim milk and the low stability in graph B when the emulsion was made similarly but without the skim milk solids. In obtaining these data for graph A an homogenized emulsion of xanthophyll-β-carotene in skim milk was stored at 17° C. There was substantially no loss of color of the carotenoid in 21 days. When, on the other hand, the skim milk solids were omitted and the emulsion of the xanthophyll-synthetic-β-carotene was made in water with Triton WR 1339 (an allylaryl-polyether alcohol, e.g., the polyether of diisobutyl phenol with ethylene oxide, in the proportion of 2–10 ethylene oxide units to the molecule) as emulsifying agent in trace proportion, the emulsion after 10 days' storage at 17° C. was substantially devoid of color.

FIG. 2 shows that mixing the carotenoid with skim milk solids in an homogenized aqueous emulsion followed by spray drying is effective in the color preservation (graph C). Mixing the same carotenoid composition in dry form with skim milk solids is not effective (graph D). The xanthophyll-carotene mixture homogenized with skim milk and then spray dried lost only 10.5% of its original coloring capacity in 21 days' storage at 25° C. whereas the same carotenoid composition mixed dry with dry skim milk powder in the same proportion lost about 82% of its coloring capacity in 16 days' storage at the same temperature.

FIG. 3 shows the improvement in the spray dried product which results from inclusion of additional lipid, beyond that required as solvent for the carotenoid in the emulsion. Graph E shows that stability in the presence of 35% lipid, on the dry basis, is greater than that shown in graph E for only 10% lipid. In this case the added lipid was furnished by a mixture of hydrogenated coconut and palm kernel oils.

Any other ingredients in the compositions compared in the several figures were minor and conventional and the same in the pair of specimens reported in each figure.

As to materials, the carotenoid used is any natural or synthetic carotenoid that is soluble in edible solvents. One of the best sources is the carotenoid concentrate prepared from the unsaponifiable oily fraction of alfalfa. This carotenoid concentrate from alfalfa is a commercial product. It is made substantially as follows: Dried alfalfa is extracted with heptane or like hydrocarbon solvent. The soluble material is then saponified by heating the hydrocarbon extract with alkali. The unsaponifiable portion is recovered by extraction with an alcohol-hydrocarbon solvent mixture. After distillation of the solvent, the residue that remains is a concentrate of carotenoids from the non-saponifiable fraction of alfalfa. The carotenoids in it have high vitamin A activity, B-carotene comprises over one-half of the total carotenoid, xanthophyll (lutein) is next to B-carotene in quantity and imparts a rich yellow color to foods, and the other components of the non-saponifiable fraction from alfalfa make an excellent solvent for the carotenoids. An additional advantage of this material is the mutually stabilizing and solvent action exerted by the naturally occurring carotenoids which it contains. Other carotenoids that we use are synthetic B-carotene, the carotenoids from carrots, corn oil, and annatto seeds.

Edible solvents which are employed are lipids. They include $C_{12}$–$C_{18}$ fatty acids, their alkyl esters, and their mono-, di-, and triglycerides, these fatty materials being suitably liquid at processing temperatures; propylene glycol; and propylene glycol monooleate and glycerol monooleate; and hydrogenated fats such as hydrogenated coconut and palm oils. The said unsaponifiables from alfalfa, which occur along with the carotenoid component thereof, and the said monooleates, however, are the preferred solvents.

The protein source used is one providing a protein that is water soluble at a pH within the range 5 to 9. Examples are skim milk solids, milk casein, whey solids, soybean flour, soy protein, and peanut protein.

Both the lipids and the proteins play a role in protecting the carotenoids in the complex from oxidation. Protection by the lipids is considered to be largely physical. When carotenoids in dispersed form, as in solution in a lipid are homogenized with protein solution, on the other hand, the protein not only provides a film that surrounds the globules of the solution and blocks diffusion of oxygen into the globules but also associates itself with the carotenoids in such manner as to inhibit the otherwise rapid oxidation of their conjugated double bonds.

Antioxidants are not necessary in the carotenoid composition so stabilized but may be used to improve further the resistance to oxidation. Examples of such antioxidants that may be used are Tenox 6 (a commercial antioxidant of composition butylated hydroxyanisole 10%, butylated hydroxytoluene 10%, propyl gallate 6%, citric acid 6%, propylene glycol 12%, and edible vegetable oil, e.g., cottonseed oil, 56%); ascorbic acid; butylated hydroxyanisole; butylated hydroxytoluene; tocopherols and nordihydroguaretic acid, sometimes referred to as NDGA.

Proportions of materials of the several classes that can be used and those that are recommended for best results are shown in the following table, proportions being expressed as parts by weight of the several materials for 100 parts total of lipid and protein source, on the dry basis.

| Component | Proportion | |
|---|---|---|
| | Permissible | For Best Results |
| Protein | 100 | 100 |
| Carotenoid | 0.005–10 | 0.5–1 |
| Lipid solvent for carotenoid | 40–300 | 150–200 |
| Antioxidant | 0–0.3 | 0.03–0.04 |

Water is used to prepare the emulsion in amount that will vary with the protein source used and is adjusted to provide proper viscosity and physical properties for homogenizing.

The invention will be further illustrated by the following specific examples of the practice of it, proportions being parts by weight.

*Example 1*

100 parts of spray dried skim milk are mixed with 400 parts of water and warmed to 160° F. with good agitation, to give a hot dispersion. Then there is introduced 10 parts of a solution of unsaponifiable extract of alfalfa in propylene glycol monooleate which contains 13 mg. of carotenoids per gram. There is also stirred in 0.05 part of the commercial antioxidant Tenox 6. The whole is well mixed, until the mixture takes on a uniform bright orange yellow color and is then homogenized in a conventional milk homogenizer at 2500 p.s.i., at a pH of 6.8.

The complex is used in emulsion form. In a modification, it is sealed in cans and then sterilized at 250° F. for 30 minutes.

*Example 2*

The procedure and composition of Example 1 are used except that the homogenized mixture, i.e., the emulsion without the canning, sealing, and sterilization is subjected to spray drying in a usual spray dryer for milk, the inlet gas temperature being about 280° F. and the outlet about 180° F. and the drying being conducted until the moisture content of the finished product is about 2.5%.

*Example 3*

The procedure and composition of Example 1 are followed except that the carotenoid solution in propylene glycol monooleate is mixed with 44 parts Kaola fat (hydrogenated mixture of coconut and palm kernel oils in approximately equal proportions by weight) before introducing the carotenoid solution into the hot dispersion of milk and water.

*Example 4*

The compositions and procedures of Examples 1, 2 and 3 are used, in turn, except that 5 parts of propylene glycol are introduced as a lipid emulsifier along with the carotenoid solution.

*Example 5*

The compositions and procedures of Examples 1–4 are used, in turn, except that the 100 parts of skim milk solids are replaced by 50 parts of defatted soy flour.

*Example 6*

The procedures and compositions of Examples 1–5 are used, in turn, except that the skim milk solids are replaced by an equal weight of whey solids.

*Example 7*

The procedures and compositions of Examples 1–6 are used, in turn, except that vitamin D is added to the carotenoid solution prior to mixing it with the protein, the vitamin D being added in amount to provide 30 I.U. for each 400 mg. of the carotenoid.

*Example 8*

The procedures and compositions of Examples 1–7 are used, in turn, except that the said carotenoid solution is replaced by 30 parts of a solution containing per gram 4.5 mg. xanthophyll, 4600 U.S.P. units of vitamin A, in the form of the palmitate dissolved in a mixture of equal parts of the non-saponifiable oily fraction of alfalfa and propylene glycol monooleate.

*Example 9*

The procedures and compositions of Examples 1–7 are used, in turn, except that the carotenoid mixture from the unsaponifiable fraction of alfalfa is replaced by an equal weight of glycerol monooleate solution of the carotenoids from annatto seed of concentration to give the same absorption of light of wave length 436 mu as given by the replaced carotenoid solution from alfalfa.

*Example 10*

The procedures and compositions of Examples 1–8 are used, in turn, except that the carotenoid solution from alfalfa is replaced by glycerol monooleate solution containing 13 mg. of the turmeric extract solids and 39 mg. of annatto extract solids for each g. of the monooleate, the solution being used in amount to give the same absorption of light of wave length 436 mu as given by the replaced carotenoid solution from alfalfa.

*Example 11*

The composition and procedure of Example 1 are used except that the solution of carotenoid from alfalfa is replaced by an equal weight of a corn oil solution of the carotenoids from carrots in amount to provide 13 mg. of carotenoids per g. of the corn oil solution.

*Example 12*

The procedure and composition of Example 1 are used except that synthetic B-carotene is used in place of the carotenoid from alfalfa in amount to give the same absorption of light of wave length 436 mu.

*Example 13*

The procedure of any of the Examples 1–12 are followed, in turn, except that the antioxidant is omitted.

The carotenoid solutions when combined with proteins as described in Examples 1 through 13 are water soluble, i.e., readily dispersible in water by solution or otherwise without precipitation or settling on standing and, therefore, are conveniently admixed into low fat processed foods. Furthermore, the process gives a product that protects the carotenoids from oxidation. This increases the stability of the carotenoids both before and after being compounded into finished food products. In addition, the carotenoids in the product of this invention are more stable then conventional compositions of this class to adverse conditions such as exposure to oxidants or to high temperatures to which bakery goods are subjected.

*Example 14*

Skim milk was heated to 195°–200° F., held at this temperature for 20 minutes, then condensed by evaporation to 20% solids, and the condensed milk cooled to 160° F. For every 6,000 pounds of this milk (1200 lbs. of solids) the following materials were admixed:

| | Lbs. |
|---|---|
| Xanthophyll carotene solution of Example 1 | 220 |
| Kaola fat (hydrogenated coconut and palm kernel oil 50:50 | 300 |
| Propylene glycol | 50 |
| Tenox 6 (antioxidant) | 1 |

The resulting mixture was maintained in a jacketed kettle at 160° F., agitated with a high speed mixer for 15 minutes, and then homogenized at a pressure of 2500 p.s.i. The resulting emulsion was spray dried under conditions given in Example 2.

The product has the desired color stability at elevated temperatures.

*Example 15*

The spray dried powder resulting from the process of Example 14 was mixed into a commercial bread dough composition, in the proportion of 0.8% of the flour. Bread was then made by the conventional sponge-dough procedure.

The following formula was used:

| Component: | Parts by weight |
|---|---|
| Flour | 100 |
| Water | 65 |
| Yeast | 2 |
| Yeast food [1] | 0.2 |
| Salt | 2.25 |
| Sugar | 7 |
| Nonfat dry milk | 2.7 |
| Carotenoid complex | 0.8 |
| Lard | 2.0 |
| Mono- and diglycerides of lard fatty acids | 0.5 |

[1] The yeast food is of the approximate composition $CaHPO_4 \cdot 2H_2O$, 49.87%; $(NH_4)_2HPO_4$, 49.88%; and $KBrO_3$, 0.25%.

A sponge was made by mixing 65% of the total flour, 60% of the water, all of the yeast and all of the yeast food for 4 minutes to a temperature of 76° F. The sponge was allowed to ferment for 4½ hours at a temperature of 80° F. and 75% R.H. The sponge was then returned to the mixer, the remainder of the flour and water, salt, sugar, nonfat dry milk, carotenoid complex, lard and mono and diglycerides were added and the entire mass was mixed for 10 minutes to a temperature of 80° F.

The resulting dough was allowed to rest for 30 minutes and then divided into 19-ounce pieces. These pieces were rounded, allowed to rest 10 minutes, moulded and placed in baking pans. The dough pieces were proofed to ¾ inch over the tops of the pans at a temperature of 110° F. and 85% R.H. and then baked at a temperature of 415° F. for 21 minutes.

Retention of the color of the carotenoid complex was excellent.

Representative results of numerous such baking tests shows retention of carotenoid when it has been completed as described.

In representative baking tests, the loss of carotenoid, as measured by extracting the carotenoid in the baked bread and then determining the amount of this pigmentary material spectrophotometrically, the loss was only 3% in contrast to a loss several times that amount when the carotenoid had not been complexed in advance.

It will be understood that it is intended to cover all changes and modifications of the examples of the invention herein chosen for the purpose of illustration which do not constitute departures from the spirit and scope of the invention.

We claim:

1. In making a carotenoid composition of improved color retention, the process which comprises admixing 0.005–10 parts by weight of a carotenoid and 40–300 parts of an edible lipid solvent into an aqueous dispersion, at a temperature of at least about 160° F., of 100 parts of a protein that is selected from the group consisting of milk, soy and peanut proteins and that is soluble in water only at a pH of 5–9, homogenizing the resulting mixture, maintaining the mixture at all times at a pH within the range 5–9 and below the temperature of heat denaturing of the said protein until a complex of the carotenoid and the protein results and a substantial part of the carotenoid becomes unextractable from the protein by petroleum ether.

2. The process of claim 1, the said carotenoid being the carotenoids of the unsaponifiable extract of alfalfa and the edible lipid being the sterol-phytol fraction of the unsaponifiable oily material of alfalfa.

3. The process of claim 1, the said protein being skim milk solids.

4. The process of claim 1, the said lipid being a glyceride ester of a $C_{12}$–$C_{18}$ fatty acid.

5. A water dispersible carotenoid composition comprising an edible lipid solvent for the carotenoid and a complex of the carotenoid with a protein selected from the group consisting of milk, soy and peanut proteins, the proportions by weight on the dry basis being about 0.005–10 parts of the carotenoid and 40–300 parts of the lipid for 100 parts of total protein, and the carotenoid being in part non-extractable from the protein by petroleum ether.

6. The composition of claim 5, the said lipid being the sterol-phytol fraction of the unsaponifiable oily material of alfalfa.

References Cited in the file of this patent

UNITED STATES PATENTS

| 2,150,315 | Briod et al. | Mar. 14, 1939 |
| 2,546,748 | Herlow | Mar. 27, 1951 |
| 2,824,092 | Thompson | Feb. 18, 1958 |
| 2,861,891 | Bauernfeind et al. | Nov. 25, 1958 |